Dec. 27, 1955  W. PEDDINGHAUS ET AL  2,728,391
COMBINED STEEL PROFILE AND PLATE SHEARS
Filed Oct. 21, 1950  2 Sheets-Sheet 1

Inventor:
WERNER PEDDINGHAUS
EMIL FUNKE
By E.T. Freeman
ATTORNEY.

Dec. 27, 1955　　W. PEDDINGHAUS ET AL　　2,728,391
COMBINED STEEL PROFILE AND PLATE SHEARS

Filed Oct. 21, 1950　　　　　　　　　　　2 Sheets-Sheet 2

Inventor:
WERNER PEDDINGHAUS
EMIL FUNKE

ATTORNEY.

United States Patent Office 2,728,391
Patented Dec. 27, 1955

2,728,391

COMBINED STEEL PROFILE AND PLATE SHEARS

Werner Peddinghaus and Emil Funke, Gevelsberg, Germany, assignors to Paul Ferd. Peddinghaus, Gevelsberg, Germany Application October 21, 1950, Serial No. 191,376

Claims priority, application Germany October 29, 1949

1 Claim. (Cl. 164—40)

This invention relates to shears for cutting steel profiles and usable simultaneously for the cutting of steel plates.

The cutter blades of the profile shears are advanced in a vertical direction towards the objects to be severed. In order to perform mitre-cuts with these shears the steel profiles are set at a predetermined angle in an inclined direction. However, large sections of the profiles cannot be severed in this manner, because the introduction of the profiles into the shears is limited by the distance between the cutter blade and the base upon which it rests; also it is difficult to attach holders for the inclined profiles to the frames of the shears and heavy profiles can only be cut in this manner if special holding structures are provided.

To overcome these difficulties inclined cutter slides were used which are slidable in a vertical plane at an angle 45° and these cutters were advanced towards the objects to be cut in a vertical direction. Thus, it has been made possible to feed the steel profiles into the shears at a direction which corresponds to the mitre-angle and to sever sections of any desired length. However, the location of the blade carrying slides and their advance in an inclined direction rendered the operation of the shears' drive extremely difficult and specifically shaped slides were required for the combined plate and profile cutting shears, as the cutter blade of the plate shears had to be guided in a vertical direction; a difficult and unsatisfactory power transmission from the cutter slide of the profile shears guided in the inclined direction to the vertically movable cutter slide of the plate shears was the unavoidable consequence.

Efforts have been made to eliminate this difficulty by using tiltably supported slides, where the shears for the steel profile were located in an inclined direction of about 45° and the plate cutters in an approximately horizontal plane. However, the radial movement of the slides required special measures to produce satisfactory mitre-cuts. Indeed, in order to approximate the radial and the rectilinear incline cutter movements, a large swiveling radius had to be maintained; this measure necessitated the use of large frictional faces of the tilting slide and greatly reduced the efficiency of the shears.

It is the object of this invention to combine the advantages of the vertical movement of the cutter slide of the plate shears with the advantage of the inclined rectilinear movement of steel profile shears and to avoid, at the same time, the disadvantages of these two shear systems. That is, the slide having the movable cutter which shears flat plates is reciprocated vertically whereas the movable cutter which shears profiled sections such as angles and channels is reciprocated in a direction inclined to the vertical. Both of the profile cutters are provided with vertical and horizontal cutting edges and the movable profile cutter is actuated by projections on the vertically reciprocable slide in response to movement of the latter. It will thus become apparent that during the operation of shearing a profile section the latter may be oriented in a position so as to have a flat horizontal bearing surface and thus be easily supported and held in proper alignment with respect to the profile cutters.

The term "mitre cut" as employed in this specification and the claim is intended to mean a cutting operation in a plane extending at an acute angle to the longitudinal axis of the profiled beam being cut. An important advantage of the present invention resides in the fact that this mitre cut can be made while the profiled beam extends in a longitudinal plane. This advantage results from the novel construction of the profile cutters in cooperation with the inclined sliding movement of the movable profile cutter which obviates the necessity for holding the profiled beam at an angle to the horizontal as heretofore practiced in the prior art.

With this object in view, the invention will now be described in detail and with reference to the accompanying drawings.

Figure 2:
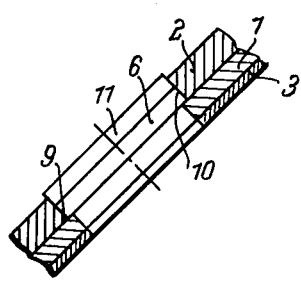
Fig. 2 is a vertical sectional view on line II—II.
Figure 3:
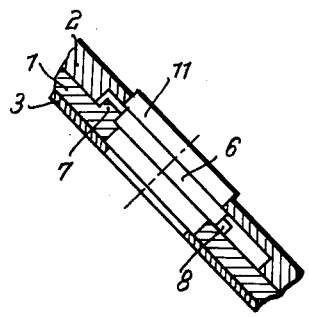
Fig. 3 is a vertical sectional view on line III—III of Fig. 1.

The cutter slide 1 is vertically displaceably guided in a frame or casing composed of the lateral plates 2, 3 and the ledges 4, 5 connecting the opposite plates 2, 3. A plate 6 which supports the profile cutters, is held on the opposite sides of the cutter slide 1 between a projecting ledge 7 inclined at an angle of 45° and forming a wedge-shaped pusher face and the return bolt 8. The cutter plate 6, the wedge-shaped ledge 7 and return bolt 8 laterally extend into a recess of plate 2; the cutter plate 6 is with its two other lateral faces coercitively guided on faces 9, 10. A plate 11 solidly inserted into casing plate 2 is oppositely located with its fixed counter knives to cutter plate 6. The lower end of the cutter slide 1 carries blade 12ᵃ which cooperates with the fixed cutter edges 12.

The shears shown in the drawing are manually operated.

Figure 1:
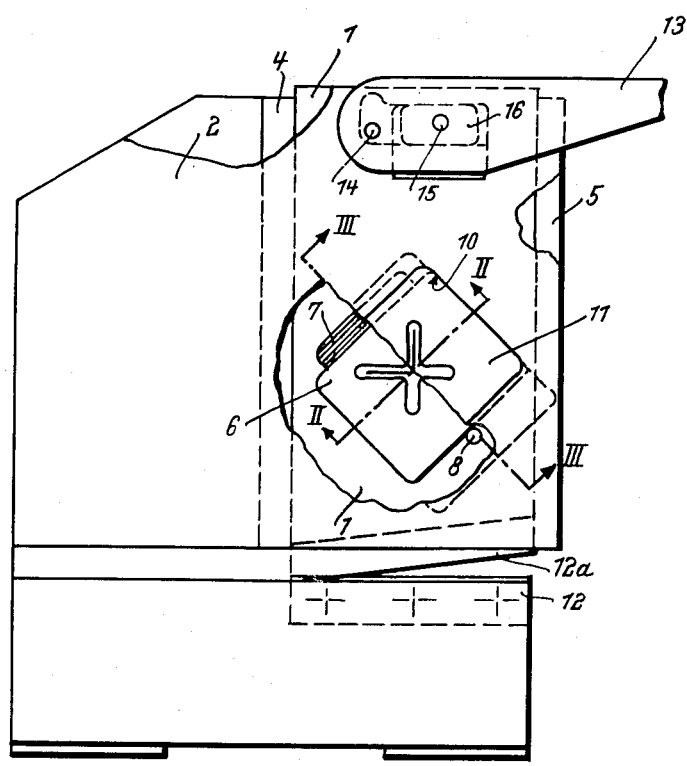
Fig. 1 is a schematic front view of the shears forming the subject matter of this invention.
Figure 4:
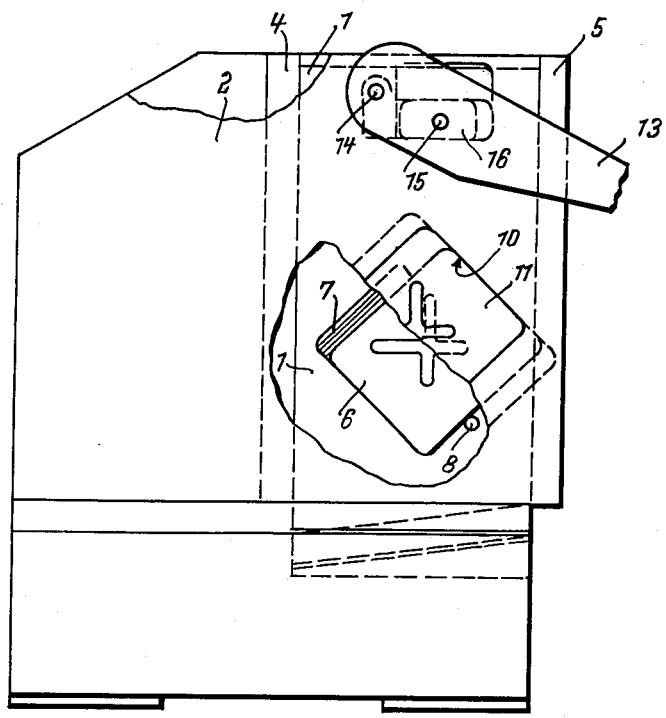
Fig. 4 shows the position of the shears upon completion of the cutting step.

The handlever 13 is pivotally supported on a bolt 14 attached to the frame of the shears. The movement of this hand lever is transmitted through a bolt 15 solidly connected with the lever and through a slide member 16 to the cutter slide 1. During the downward movement of the slide 1, the cutter plate 6 is displaced at an angle of 45°; by the action of wedge-shaped pusher face 7 along the guides 9, 10 of the casing plate 2 from the position shown in Fig. 1 into the final position shown in Fig. 4, the profile being then already severed.

During the back movement of the cutter slide 1, the cutter plate 6 is returned by bolt 8 in its normal position, where its cutting edges are aligned with those of the fixed cutter plate 11. The plate shears 12ᵃ which is solidly connected with slide 1 takes part in the vertical to-and-fro movement of the cutter slide.

The manual drive of the cutter slide may be replaced by electrical, hydraulic or any other mechanical driving means.

As apparent from the above, the profile cutter is displaced in an inclined direction at an angle of 45°, which is required for the mitre-cuts, and the plate cutter is simultaneously and directly displaced in a vertical direction by a simple vertical movement of the cutter slide 1. In other words, the slide 1 which has affixed thereto the movable plate cutter 1 reciprocates in a vertical direction so that the flat plate work-pieces to be sheared thereby may be easily supported in the horizontal position during the shearing operation. Furthermore, each of the plate-shaped cutters 6, 16, is provided with a cross-shaped opening therethrough and having vertical and horizontal cutting edges as is commonly practiced in the art. This orientation of the cutting edges and the inclined direction of reciprocal movement of the cutter enables a profile section such as the angle section shown in the drawing to be oriented so as to have a leg or other flat surface of the profile section enabling the section to be easily and rigidly supported in proper relation to the cutting edges.

An extremely simple construction of the shears and an economical mode of power transmission is obtained in this manner.

The invention has been described with reference to a preferred embodiment and it will be understood that many variations and modifications thereof may be resorted to without departure from the scope of the invention as defined in the following claim.

We claim:

A device for cutting steel plates and profiled steel beams, said device comprising a vertical front plate, a vertical rear plate and two vertical lateral guide ledges connecting said front and said rear plates, a slide vertically displaceable between and guided by said guide ledges along said front and rear plates, a first plate-shaped cutter fixedly secured to said front plate, the latter having an inner recess defining a slideway at an angle inclined to the vertical, a second plate-shaped cutter reciprocally slidable in the inclined slideway of said front plate and coacting during its displacement with said first plate-shaped cutter, two projections attached to said slide, one projection being located above and the other projection below said second plate-shaped cutter, said projections adapted to coact with said second plate-shaped cutter during the movement of said slide to displace said plate-shaped cutter in the recess of said front plate.

References Cited in the file of this patent

UNITED STATES PATENTS

| | | |
|---|---|---|
| 897,984 | Kruger | Sept. 8, 1908 |
| 983,585 | Wachter | Feb. 7, 1911 |
| 1,091,668 | Koehl | Mar. 31, 1914 |
| 1,792,522 | Yates | Feb. 17, 1931 |
| 2,366,987 | Soutar | Jan. 9, 1945 |

FOREIGN PATENTS

| | | |
|---|---|---|
| 122,063 | Germany | July 19, 1901 |
| 451,563 | Germany | July 1, 1924 |
| 631,825 | Germany | Feb. 20, 1935 |
| 634,708 | Germany | Aug. 13, 1936 |